United States Patent
Ulrich et al.

(10) Patent No.: US 9,432,082 B2
(45) Date of Patent: Aug. 30, 2016

(54) BUS REVERSABLE ORTHOGONAL DIFFERENTIAL VECTOR SIGNALING CODES

(71) Applicant: Kandou Labs S.A., Lausanne (CH)

(72) Inventors: Roger Ulrich, Bern (CH); Amin Shokrollahi, Preverenges (CH)

(73) Assignee: KANDOU LABS, S.A. (CH)

( * ) Notice: Subject to any disclaimer, the term of this patent is extended or adjusted under 35 U.S.C. 154(b) by 0 days.

(21) Appl. No.: 14/796,645

(22) Filed: Jul. 10, 2015

(65) Prior Publication Data

US 2016/0020824 A1 Jan. 21, 2016

Related U.S. Application Data

(60) Provisional application No. 62/025,712, filed on Jul. 17, 2014.

(51) Int. Cl.
*H04L 27/06* (2006.01)
*H04B 3/50* (2006.01)

(52) U.S. Cl.
CPC ........................... *H04B 3/50* (2013.01)

(58) Field of Classification Search
CPC . H04L 1/0057; H04L 1/0031; H04L 1/0027; H04L 1/1893; H04L 1/0637; H04L 1/0675; H04L 25/03898; H04L 27/3416; H04L 2025/03802; H04L 27/2601; H04L 2001/0094; H04L 1/0662; H03M 13/271; H03M 13/2707; H03M 13/616; H03M 13/1168; H03M 13/2739; H03M 13/2753; H04B 3/00; H04H 40/18

USPC .......... 375/260, 288, 340; 341/81; 711/157; 712/221; 708/520; 340/870.22
See application file for complete search history.

(56) References Cited

U.S. PATENT DOCUMENTS

| | | |
|---|---|---|
| 3,196,351 A | 7/1965 | Slepian |
| 3,636,463 A | 1/1972 | Ongkiehong |
| 3,939,468 A | 2/1976 | Mastin |
| 4,163,258 A | 7/1979 | Ebihara et al. |
| 4,181,967 A | 1/1980 | Nash et al. |
| 4,206,316 A | 6/1980 | Burnsweig et al. |

(Continued)

FOREIGN PATENT DOCUMENTS

| | | |
|---|---|---|
| CN | 101478286 | 7/2009 |
| EP | 2039221 B1 | 3/2009 |

(Continued)

OTHER PUBLICATIONS

International Search Report and Written Opinion of the International Searching Authority, mailed Nov. 5, 2012, in International Patent Application S.N. PCT/EP2012/052767, 7 pages.

(Continued)

*Primary Examiner* — Rahel Guarino
(74) *Attorney, Agent, or Firm* — Invention Mine LLC

(57) ABSTRACT

Properties and the construction method of Orthogonal Differential Vector Signaling Codes are disclosed which are tolerant of order-reversal, as may occur when physical routing of communications channel wires causes the bus signal order to be reversed. Operation using the described codes with such bus-reversed signals can avoid complete logical or physical re-ordering of received signals or other significant duplication of receiver resources.

20 Claims, 6 Drawing Sheets

(56) References Cited

U.S. PATENT DOCUMENTS

| | | | |
|---|---|---|---|
| 4,276,543 A | 6/1981 | Miller | |
| 4,486,739 A | 12/1984 | Franaszeck et al. | |
| 4,499,550 A | 2/1985 | Ray et al. | |
| 4,774,498 A | 9/1988 | Traa | |
| 4,864,303 A | 9/1989 | Ofek | |
| 4,897,657 A | 1/1990 | Brubaker | |
| 5,053,974 A | 10/1991 | Penz | |
| 5,166,956 A | 11/1992 | Baltus et al. | |
| 5,168,509 A | 12/1992 | Nakamura et al. | |
| 5,283,761 A | 2/1994 | Gillingham | |
| 5,287,305 A | 2/1994 | Yoshida | |
| 5,412,689 A | 5/1995 | Chan et al. | |
| 5,449,895 A | 9/1995 | Hecht | |
| 5,459,465 A | 10/1995 | Kagey | |
| 5,511,119 A | 4/1996 | Lechleider | |
| 5,553,097 A | 9/1996 | Dagher | |
| 5,599,550 A | 2/1997 | Kohlruss et al. | |
| 5,659,353 A | 8/1997 | Kostreski et al. | |
| 5,802,356 A | 9/1998 | Gaskins | |
| 5,825,808 A | 10/1998 | Hershey et al. | |
| 5,875,202 A | 2/1999 | Venters | |
| 5,945,935 A | 8/1999 | Kusumoto | |
| 5,995,016 A | 11/1999 | Perino | |
| 6,005,895 A | 12/1999 | Perino et al. | |
| 6,084,883 A | 7/2000 | Norrell et al. | |
| 6,172,634 B1 | 1/2001 | Leonowich et al. | |
| 6,175,230 B1 | 1/2001 | Hamblin et al. | |
| 6,232,908 B1 | 5/2001 | Nakaigawa | |
| 6,278,740 B1 | 8/2001 | Nordyke | |
| 6,346,907 B1 | 2/2002 | Dacy | |
| 6,359,931 B1 | 3/2002 | Perino et al. | |
| 6,404,820 B1 | 6/2002 | Postol | |
| 6,417,737 B1 | 7/2002 | Moloudi et al. | |
| 6,452,420 B1 | 9/2002 | Wong | |
| 6,483,828 B1 | 11/2002 | Balachandran | |
| 6,504,875 B2 | 1/2003 | Perino et al. | |
| 6,509,773 B2 | 1/2003 | Buchwald | |
| 6,556,628 B1 | 4/2003 | Poulton et al. | |
| 6,563,382 B1 | 5/2003 | Yang et al. | |
| 6,621,427 B2 | 9/2003 | Greenstreet | |
| 6,624,699 B2 | 9/2003 | Yin | |
| 6,650,638 B1 | 11/2003 | Walker et al. | |
| 6,661,355 B2 | 12/2003 | Cornelius et al. | |
| 6,766,342 B2 | 7/2004 | Kechriotis | |
| 6,839,429 B1 | 1/2005 | Gaikwad et al. | |
| 6,865,234 B1 * | 3/2005 | Agazzi | G01R 31/3004 341/103 |
| 6,865,236 B1 | 3/2005 | Terry | |
| 6,954,492 B1 | 10/2005 | Williams | |
| 6,990,138 B2 | 1/2006 | Bejjani | |
| 6,999,516 B1 | 2/2006 | Rajan | |
| 7,023,817 B2 | 4/2006 | Kuffner | |
| 7,053,802 B2 | 5/2006 | Cornelius | |
| 7,085,153 B2 | 8/2006 | Ferrant et al. | |
| 7,142,612 B2 | 11/2006 | Horowitz et al. | |
| 7,142,865 B2 | 11/2006 | Tsai | |
| 7,167,019 B2 | 1/2007 | Broyde et al. | |
| 7,180,949 B2 | 2/2007 | Kleveland et al. | |
| 7,184,483 B2 | 2/2007 | Rajan | |
| 7,335,976 B2 | 2/2008 | Chen | |
| 7,356,213 B1 | 4/2008 | Cunningham et al. | |
| 7,358,869 B1 | 4/2008 | Chiarulli et al. | |
| 7,362,130 B2 | 4/2008 | Broyde et al. | |
| 7,389,333 B2 | 6/2008 | Moore et al. | |
| 7,428,273 B2 | 9/2008 | Foster | |
| 7,633,850 B2 | 12/2009 | Ahn | |
| 7,643,588 B2 | 1/2010 | Visalli | |
| 7,656,321 B2 | 2/2010 | Wang | |
| 7,697,915 B2 | 4/2010 | Behzad | |
| 7,706,524 B2 | 4/2010 | Zerbe | |
| 7,746,764 B2 | 6/2010 | Rawlins et al. | |
| 7,787,572 B2 | 8/2010 | Scharf et al. | |
| 7,841,909 B2 | 11/2010 | Murray | |
| 7,869,497 B2 | 1/2011 | Benvenuto | |
| 7,882,413 B2 | 2/2011 | Chen et al. | |
| 7,933,770 B2 | 4/2011 | Kruger et al. | |
| 8,064,535 B2 | 11/2011 | Wiley | |
| 8,091,006 B2 | 1/2012 | Prasad et al. | |
| 8,106,806 B2 | 1/2012 | Toyomura | |
| 8,159,375 B2 | 4/2012 | Abbasfar | |
| 8,159,376 B2 | 4/2012 | Abbasfar | |
| 8,199,849 B2 | 6/2012 | Oh | |
| 8,253,454 B2 | 8/2012 | Lin | |
| 8,279,094 B2 | 10/2012 | Abbasfar | |
| 8,295,250 B2 | 10/2012 | Gorokhov | |
| 8,310,389 B1 | 11/2012 | Chui | |
| 8,406,315 B2 | 3/2013 | Tsai | |
| 8,429,495 B2 | 4/2013 | Przybylski | |
| 8,442,099 B1 | 5/2013 | Sederat | |
| 8,442,210 B2 | 5/2013 | Zerbe | |
| 8,443,223 B2 | 5/2013 | Abbasfar | |
| 8,462,891 B2 | 6/2013 | Kizer et al. | |
| 8,498,368 B1 | 7/2013 | Husted | |
| 8,520,493 B2 | 8/2013 | Goulahsen | |
| 8,547,272 B2 | 10/2013 | Nestler et al. | |
| 8,578,246 B2 | 11/2013 | Mittelholzer | |
| 8,588,280 B2 | 11/2013 | Oh et al. | |
| 8,593,305 B1 | 11/2013 | Tajalli et al. | |
| 8,638,241 B2 | 1/2014 | Sudhakaran | |
| 8,649,445 B2 | 2/2014 | Cronie et al. | |
| 8,649,460 B2 | 2/2014 | Ware et al. | |
| 8,718,184 B1 | 5/2014 | Cronie | |
| 8,780,687 B2 | 7/2014 | Clausen | |
| 8,782,578 B2 | 7/2014 | Tell | |
| 8,879,660 B1 | 11/2014 | Peng | |
| 8,949,693 B2 | 2/2015 | Ordentlich | |
| 8,951,072 B2 | 2/2015 | Hashim | |
| 8,989,317 B1 | 3/2015 | Holden | |
| 9,036,764 B1 | 5/2015 | Hossain | |
| 9,069,995 B1 | 6/2015 | Cronie | |
| 9,077,386 B1 | 7/2015 | Holden | |
| 9,093,791 B2 | 7/2015 | Liang | |
| 9,100,232 B1 | 8/2015 | Hormati | |
| 9,281,785 B2 | 3/2016 | Sjoland | |
| 9,331,962 B2 | 5/2016 | Lida | |
| 9,362,974 B2 | 6/2016 | Fox | |
| 2001/0055344 A1 | 12/2001 | Lee et al. | |
| 2002/0034191 A1 | 3/2002 | Shattil | |
| 2002/0044316 A1 | 4/2002 | Myers | |
| 2002/0057592 A1 | 5/2002 | Robb | |
| 2002/0154633 A1 | 10/2002 | Shin | |
| 2002/0163881 A1 | 11/2002 | Dhong | |
| 2002/0174373 A1 | 11/2002 | Chang | |
| 2003/0071745 A1 | 4/2003 | Greenstreet | |
| 2003/0105908 A1 | 6/2003 | Perino et al. | |
| 2003/0146783 A1 | 8/2003 | Bandy et al. | |
| 2003/0227841 A1 | 12/2003 | Tateishi et al. | |
| 2004/0003336 A1 | 1/2004 | Cypher | |
| 2004/0003337 A1 | 1/2004 | Cypher | |
| 2004/0057525 A1 | 3/2004 | Rajan et al. | |
| 2004/0086059 A1 | 5/2004 | Eroz et al. | |
| 2004/0156432 A1 | 8/2004 | Hidaka | |
| 2005/0057379 A1 | 3/2005 | Jansson | |
| 2005/0135182 A1 | 6/2005 | Perino et al. | |
| 2005/0149833 A1 | 7/2005 | Worley | |
| 2005/0152385 A1 | 7/2005 | Cioffi | |
| 2005/0174841 A1 | 8/2005 | Ho | |
| 2005/0286643 A1 | 12/2005 | Ozawa et al. | |
| 2006/0115027 A1 | 6/2006 | Srebranig | |
| 2006/0159005 A1 | 7/2006 | Rawlins et al. | |
| 2007/0188367 A1 | 8/2007 | Yamada | |
| 2007/0260965 A1 | 11/2007 | Schmidt et al. | |
| 2007/0263711 A1 | 11/2007 | Kramer et al. | |
| 2007/0283210 A1 | 12/2007 | Prasad et al. | |
| 2008/0104374 A1 | 5/2008 | Mohamed | |
| 2008/0159448 A1 | 7/2008 | Anim-Appiah et al. | |
| 2008/0169846 A1 | 7/2008 | Lan et al. | |
| 2008/0273623 A1 | 11/2008 | Chung et al. | |
| 2008/0284524 A1 | 11/2008 | Kushiyama | |
| 2009/0059782 A1 | 3/2009 | Cole | |
| 2009/0092196 A1 | 4/2009 | Okunev | |
| 2009/0132758 A1 | 5/2009 | Jiang | |
| 2009/0154500 A1 | 6/2009 | Diab et al. | |
| 2009/0163612 A1 | 6/2009 | Lee et al. | |

(56) References Cited

U.S. PATENT DOCUMENTS

| | | |
|---|---|---|
| 2009/0185636 A1 | 7/2009 | Palotai et al. |
| 2009/0193159 A1 | 7/2009 | Li |
| 2009/0212861 A1 | 8/2009 | Lim et al. |
| 2009/0228767 A1 | 9/2009 | Oh et al. |
| 2009/0257542 A1 | 10/2009 | Evans et al. |
| 2010/0104047 A1 | 4/2010 | Chen et al. |
| 2010/0180143 A1 | 7/2010 | Ware et al. |
| 2010/0205506 A1 | 8/2010 | Hara |
| 2010/0296550 A1 | 11/2010 | Abou Rjeily |
| 2010/0296556 A1 | 11/2010 | Rave |
| 2011/0051854 A1 | 3/2011 | Kizer et al. |
| 2011/0084737 A1 | 4/2011 | Oh et al. |
| 2011/0127990 A1 | 6/2011 | Wilson et al. |
| 2011/0235501 A1 | 9/2011 | Goulahsen |
| 2011/0268225 A1 | 11/2011 | Cronie et al. |
| 2011/0299555 A1 | 12/2011 | Cronie et al. |
| 2011/0302478 A1 | 12/2011 | Cronie et al. |
| 2011/0317559 A1 | 12/2011 | Kern et al. |
| 2012/0063291 A1 | 3/2012 | Hsueh |
| 2012/0152901 A1 | 6/2012 | Nagorny |
| 2012/0161945 A1 | 6/2012 | Single |
| 2012/0213299 A1 | 8/2012 | Cronie et al. |
| 2013/0010892 A1 | 1/2013 | Cronie et al. |
| 2013/0051162 A1 | 2/2013 | Amirkhany et al. |
| 2014/0226455 A1 | 8/2014 | Schumacher |
| 2014/0254730 A1 | 9/2014 | Kim et al. |
| 2015/0010044 A1 | 1/2015 | Zhang |
| 2015/0078479 A1 | 3/2015 | Whitby-Stevens |
| 2015/0333940 A1 | 11/2015 | Shokrollahi |
| 2015/0381232 A1 | 12/2015 | Ulrich |
| 2016/0020796 A1 | 1/2016 | Hormati |
| 2016/0036616 A1 | 2/2016 | Holden |

FOREIGN PATENT DOCUMENTS

| | | |
|---|---|---|
| JP | 2003163612 | 6/2003 |
| WO | 2009084121 | 7/2009 |
| WO | 2010031824 | 3/2010 |
| WO | 2011119359 | 9/2011 |

OTHER PUBLICATIONS

International Search Report and Written Opinion of the International Searching Authority, mailed Jul. 14, 2011 in International Patent Application S.N. PCT/EP2011/002170, 10 pages.

Healey, A., et al., "A Comparison of 25 Gbps NRZ & PAM-4 Modulation used in Legacy & Premium Backplane Channels", DesignCon 2012, 16 pages.

International Search Report for PCT/US2014/053563, dated Nov. 11, 2014, 2 pages.

Clayton, P., "Introduction to Electromagnetic Compatibility", Wiley-Interscience, 2006.

She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Poulton, et al., "Multiwire Differential Signaling", UNC-CH Department of Computer Science Version 1.1, Aug. 6, 2003.

Skliar et al., A Method for the Analysis of Signals: the Square-Wave Method, Mar. 2008, Revista de Matematica: Teoria y Aplicationes, pp. 09-129.

International Search Report and Written Opinion from PCT/US2014/034220 mailed Aug. 21, 2014.

International Search Report and Written Opinion for PCT/US14/052986 mailed Nov. 24, 2014.

Burr, "Spherical Codes for M-ARY Code Shift Keying", University of York, Apr. 2, 1989, pp. 67-72, United Kingdom.

Slepian, D., "Premutation Modulation", IEEE, vol. 52, No. 3, Mar. 1965, pp. 228-236.

Stan, M., et al., "Bus-Invert Coding for Low-Power I/O, IEEE Transactions on Very Large Scale Integration (VLSI) Systems", vol. 3, No. 1, Mar. 1995, pp. 49-58.

Tallani, L. et al., "Transmission Time Analysis for the Parallel Asynchronous Communication Scheme", IEEE Tranactions on Computers, vol. 52, No. 5, May 2003, pp. 558-571.

International Search Report and Written Opinion for PCT/EP2012/052767 mailed May 11, 2012.

International Search Report and Written Opinion for PCT/EP2011/059279 mailed Sep. 22, 2011.

International Search Report and Written Opinion for PCT/EP2011/074219 mailed Jul. 4, 2012.

Notification of Transmittal of the International Search Report and the Written Opinion of the International Searching Authority, or the Declaration for PCT/EP2013/002681, dated Feb. 25, 2014, 15 pages.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Abbasfar, A., "Generalized Differential Vector Signaling", IEEE International Conference on Communications, ICC '09, (Jun. 14, 2009), pp. 1-5.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Wang et al., "Applying CDMA Technique to Network-on-Chip", IEEE Transactions on Very Large Scale Integration (VLSI) Systems, vol. 15, No. 10 (Oct. 1, 2007), pp. 1091-1100.

Cheng, W., "Memory Bus Encoding for Low Power: A Tutorial", Quality Electronic Design, IEEE, International Symposium on Mar. 26-28, 2001, pp. 199-204, Piscataway, NJ.

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.

Notification of Transmittal of International Search Report and the Written Opinion of the International Searching Authority, for PCT/US2015/018363, mailed Jun. 18, 2015, 13 pages.

Counts, L., et al., "One-Chip Slide Rule Works with Logs, Antilogs for Real-Time Processing," Analog Devices Computational Products 6, Reprinted from Electronic Design, May 2, 1985, 7 pages.

Design Brief 208 Using the Anadigm Multiplier CAM, Copyright 2002 Anadigm, 6 pages.

Grahame, J., "Vintage Analog Computer Kits," posted on Aug. 25, 2006 in Classic Computing, 2 pages, http://www.retrothing.com/2006/08/classic_analog_.html.

Schneider, J., et al., "ELEC301 Project: Building an Analog Computer," Dec. 19, 1999, 8 pages, http://www.clear.rice.edu/elec301/Projects99/anlgcomp/.

Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.

"Introduction to: Analog Computers and the DSPACE System," Course Material ECE 5230 Spring 2008, Utah State University, www.coursehero.com, 12 pages.

Notification of Transmittal of the International Search Report and the Written Opinion of the International Searching Authority, or the Declaration, for PCT/US2014/015840, dated May 20, 2014. 11 pages.

Notification of Transmittal of the International Search Report and the Written Opinion of the International Searching Authority, or the Declaration, for PCT/US2014/043965, dated Oct. 22, 2014, 10 pages.

Notification of Transmittal of the International Search Report and the Written Opinion of the International Searching Authority, or the Declaration, dated Mar. 3, 2015, for PCT/US2014/066893, 9 pages.

International Preliminary Report on Patentability for PCT/US2014/015840, dated Aug. 11, 2015, 7 pages.

Jiang, A., et al., "Rank Modulation for Flash Memories", IEEE Transactions of Information Theory, Jun. 2006, vol. 55, No. 6, pp. 2659-2673.

(56) References Cited

OTHER PUBLICATIONS

Zouhair Ben-Neticha et al, "The streTched-Golay and other codes for high-SNR finite-delay quantization of the Gaussian source at ½ Bit per sample", IEEE Transactions on Communications, vol. 38, No. 12 Dec. 1, 1990, pp. 2089-2093, XP000203339, ISSN: 0090-6678, DOI: 10.1109/26.64647.

Oh, et al., Pseudo-Differential Vector Signaling for Noise Reduction in Single-Ended Signaling, DesignCon 2009.

Loh, M., et al., "A 3×9 Gb/s Shared, All-Digital CDR for High-Speed, High-Density I/O", Matthew Loh, IEEE Journal of Solid-State Circuits, Vo. 47, No. 3, Mar. 2012.

\* cited by examiner

BUS REVERSABLE ORTHOGONAL DIFFERENTIAL VECTOR SIGNALING CODES

This application claims priority to U.S. Provisional Patent Application 62/025,712, filed Jul. 17, 2014, naming Roger Ulrich, entitled "Bus Reversable Orthogonal Differential Vector Signaling Code" which is herein incorporated by reference in its entirety for all purposes.

REFERENCES

The following references are herein incorporated by reference in their entirety for all purposes:

U.S. Patent Publication No. 2011/0268225 of U.S. patent application Ser. No. 12/784,414, filed May 20, 2010, naming Harm Cronie and Amin Shokrollahi, entitled "Orthogonal Differential Vector Signaling" (hereinafter "Cronie I");

U.S. Patent Publication No. 2011/0302478 of U.S. patent application Ser. No. 12/982,777, filed Dec. 30, 2010, naming Harm Cronie and Amin Shokrollahi, entitled "Power and Pin Efficient Chip-to-Chip Communications with Common-Mode Rejection and SSO Resilience" (hereinafter "Cronie II");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III");

U.S. Patent Publication No. 2011/0299555 of U.S. patent application Ser. No. 13/154,009, filed Jun. 6, 2011, naming Harm Cronie and Amin Shokrollahi, entitled "Error Control Coding for Orthogonal Differential Vector Signaling" (hereinafter "Cronie IV");

U.S. Provisional Patent Application No. 61/763,403, filed Feb. 11, 2013, naming John Fox, Brian Holden, Ali Hormati, Peter Hunt, John D Keay, Amin Shokrollahi, Anant Singh, Andrew Kevin John Stewart, Giuseppe Surace, and Roger Ulrich, entitled "Methods and Systems for High Bandwidth Chip-to-Chip Communications Interface" (hereinafter called "Fox I");

U.S. Provisional Patent Application No. 61/773,709, filed Mar. 6, 2013, naming John Fox, Brian Holden, Peter Hunt, John D Keay, Amin Shokrollahi, Andrew Kevin John Stewart, Giuseppe Surace, and Roger Ulrich, entitled "Methods and Systems for High Bandwidth Chip-to-Chip Communications Interface" (hereinafter called "Fox II");

U.S. Provisional Patent Application No. 61/812,667, filed Apr. 16, 2013, naming John Fox, Brian Holden, Ali Hormati, Peter Hunt, John D Keay, Amin Shokrollahi, Anant Singh, Andrew Kevin John Stewart, and Giuseppe Surace, entitled "Methods and Systems for High Bandwidth Communications Interface" (hereinafter called "Fox III");

U.S. patent application Ser. No. 13/842,740, filed Mar. 15, 2013, naming Brian Holden, Amin Shokrollahi, and Anant Singh, entitled "Methods and Systems for Skew Tolerance and Advanced Detectors for Vector Signaling Codes for Chip-to-Chip Communication" (hereinafter called "Holden I");

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences" (hereinafter called "Ulrich I").

U.S. patent application Ser. No. 14/315,306, filed Jun. 25, 2014, naming Roger Ulrich, entitled "Multilevel Driver for High Speed Chip-to-Chip Communications" (hereinafter called "Ulrich II").

U.S. Provisional Patent Application No. 61/934,804, filed Feb. 2, 2014, naming Ali Hormati and Amin Shokrollahi, entitled "Method for Code Evaluation using ISI Ratio" (hereinafter called "Hormati I").

U.S. Provisional Patent Application No. 61/992,711, filed May 13, 2014, naming Amin Shokrollahi, entitled "Vector Signaling Code with Improved Noise Margin" (hereinafter called "Shokrollahi I").

U.S. Provisional Patent Application No. 62/023,163, filed Jul. 10, 2014, naming Amin Shokrollahi and Roger Ulrich, entitled "Vector Signaling Code with Improved Noise Margin" (hereinafter called "Shokrollahi II").

BACKGROUND

In communication systems, a goal is to transport information from one physical location to another. It is typically desirable that the transport of this information is reliable, is fast and consumes a minimal amount of resources. One common information transfer medium is the serial communications link, which may be based on a single wire circuit relative to ground or other common reference, or multiple such circuits relative to ground or other common reference. A common example uses singled-ended signaling ("SES"). SES operates by sending a signal on one wire, and measuring the signal relative to a fixed reference at the receiver. A serial communication link may also be based on multiple circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

There are a number of signaling methods that maintain the desirable properties of DS while increasing pin efficiency over DS. Vector signaling is a method of signaling. With vector signaling, a plurality of signals on a plurality of wires is considered collectively although each of the plurality of signals might be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector might refer to the number of degrees of freedom of signals on the plurality of wires instead of exactly the number of wires in the plurality of wires.

With binary vector signaling, each component or "symbol" of the vector takes on one of two possible values. With non-binary vector signaling, each symbol has a value that is a selection from a set of more than two possible values. The set of values that a symbol of the vector may take on is called the "alphabet" of the vector signaling code. A vector signaling code, as described herein, is a collection C of vectors of the same length N, called codewords. Any suitable subset of a vector signaling code denotes a "subcode" of that code. Such a subcode may itself be a vector signaling code. Orthogonal Differential Vector Signaling codes (ODVS) as described in [Cronie I] are one specific example of a vector signaling code as used in descriptions herein.

In operation, the coordinates of the codewords are bounded, and we choose to represent them by real numbers between −1 and 1. The ratio between the binary logarithm of the size of C and the length N is called the pin-efficiency of the vector signaling code.

A vector signaling code is called "balanced" if for all its codewords the sum of the coordinates is always zero. Balanced vector signaling codes have several important properties. For example, as is well-known to those of skill in the art, balanced codewords lead to lower electromagnetic interference (EMI) noise than non-balanced ones. Also, if common mode resistant communication is required, it is advisable to use balanced codewords, since otherwise power is spent on generating a common mode component that is cancelled at the receiver.

Additional examples of vector signaling methods are described in Cronie I, Cronie II, Cronie III, Cronie IV, Fox I, Fox II, Fox III, Holden I, Shokrollahi I, and Hormati I.

BRIEF DESCRIPTION

Properties and the construction method of Orthogonal Differential Vector Signaling Codes are disclosed which are tolerant of order-reversal, as may occur when physical routing of communications channel wires causes the bus signal order to be reversed. Operation using the described codes with such bus-reversed signals can avoid complete logical or physical re-ordering of received signals or other significant duplication of receiver resources.

DETAILED DESCRIPTION

Figure 1:
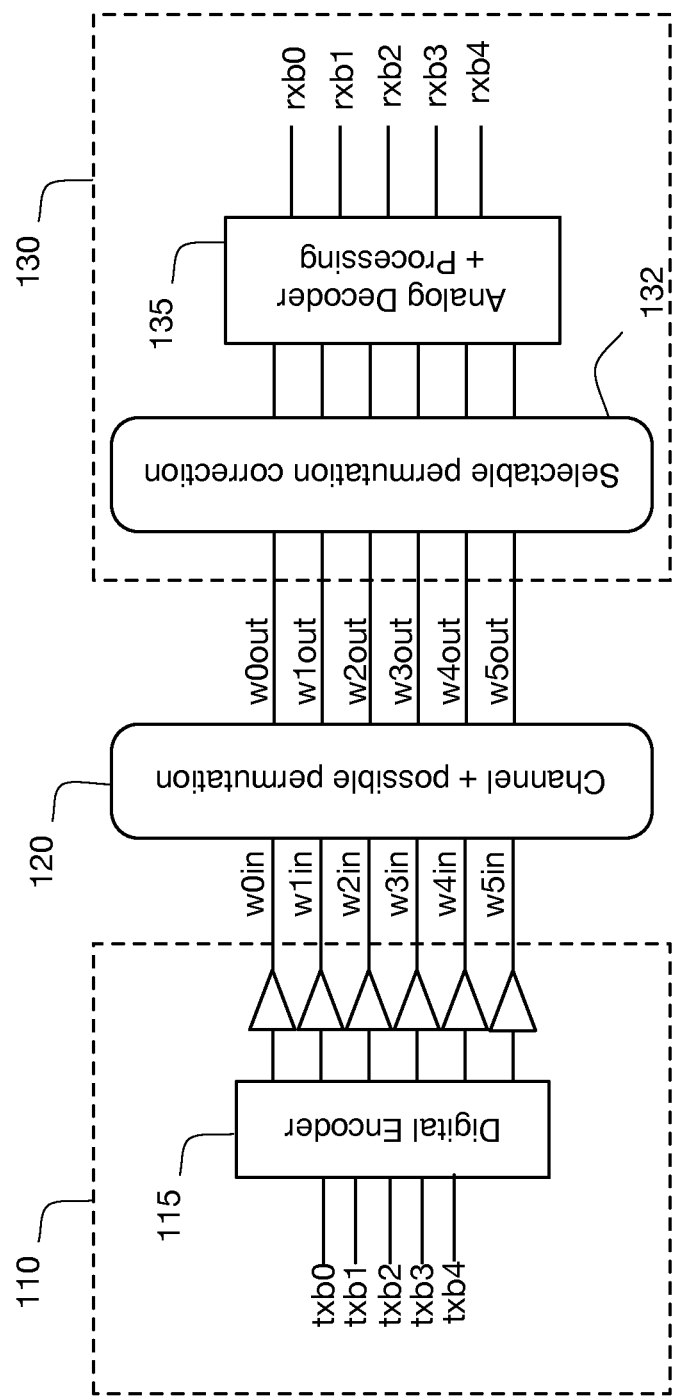
FIG. 1 shows a prior art configuration of a transmitter and receiver interconnected by a multiwire channel that may be bus reversed.

The concept of orthogonal vector signaling has been introduced in [Croniel]. As presented there, an orthogonal differential vector signaling (ODVS) code may be obtained via the multiplication $$(0, x_2, \ldots, x_n) \cdot M/a \qquad \text{[Eqn. 1]}$$

wherein M is an orthogonal n×n-matrix in which the sum of the columns is zero except at the first position, $x_2, \ldots, x_n$ belong to a set S describing the original modulation of these symbols, and a is a normalization constant which ensures that all the coordinates of the resulting vector are between −1 and +1. In the following, we call an orthogonal matrix for which the sum of the columns is zero except in the first position an "ODVS generating matrix."

For example, in case of binary modulation, the set S may be chosen to be {−1,+1}. In case of ternary modulation, the set S may be chosen as {−1,0,1}, in case of quaternary modulation, the set S may be chosen as {−3,−1,1,3}, and in case of quintary modulation S may be chosen as {−2,−1,0, 1,2}.

In operation, the matrix M does not need to be orthogonal. It suffices that all its rows are pairwise orthogonal (even if the rows are not of Euclidean norm 1). In the following, we call such matrices s-orthogonal (scaled orthogonal).

For proper working of this scheme it is not necessary that all the $x_i$ are modulated by the same set S.

Detection of the transmitted signals can be accomplished with the matrix M in the following manner. Each row of M is scaled in such a way as to ensure that the sum of the positive entries in that row is equal to 1. Then the entries of each row of the new matrix (except for the first) are used as coefficients of a multi-input comparator as defined in [Holden I]. For example, if n=6, the values on the 6 wires (possibly after equalization) are denoted by a, b, c. d. e. f and the row is [1/2,1/4,−1/2,1/4,−1/2,0], then the multi-input comparator would calculate the value $$\frac{a}{2} + \frac{b+d}{4} - \left(\frac{c+e}{2}\right) \qquad \text{[Eqn. 2]}$$

and would slice the result. In case of binary modulation, such slicing is performed by a digital comparator, whereas for higher order modulation a stack of digital comparators with distinct threshold references may be used as taught in [Shokrollahi II]. Alternatively, the result may be passed through an Analog-to-Digital converter with appropriate precision.

In a typical application using an ODVS code to communicate between two integrated circuit devices, multiple chip pins or pads are interconnected as a parallel bus. Following conventional best practice, one chip will be designed to have the required number of I/O pins sequentially assigned to the communications interface function, as one example along its rightmost package edge, and the other chip will be designed to have the same connections assigned, continuing the example, along its leftmost package edge such that a series of equal-length straight signal traces may connect the pins in consecutive order.

However, even when integrated circuit devices are designed to facilitate such optimized physical interconnection, the desired results may be impractical to achieve in practice. The physical placement of the two chips may preclude direct equal-length connections, requiring trace routing at right angles or using vias, which introduce impedance anomalies and signal path length differences. In the worst case, often occurring with "flip chip" packaging and/or actives-both-sides PCB designs, the only available routing path between the two devices results in the sequential order of the I/O pin signals being reversed between the two devices. Such situations may also occur if symmetrical "plug in either way" connectors are used for interconnections. This is typically referred to as "bus reversal" since effectively the signals on the wires are presented to the receiver in reversed sequential order.

FIG. 1 illustrates a prior art transmitting device 110 connected to a receiving device 130 via a multiwire channel 120 which may (or may not) be bus reversed. If the bus is not reversed, transmitted channel signals w0in, ..., w5in correspond directly to received channel signals w0out, ..., w5out. If the bus is reversed, the signal w0in appears at w5out, w1in appears at w4out, w2in appears at w3out, w3in appears at w2out, w4in appears at w1out, and w5in appears at w0out. To insure that received data rxb0-rxb4 in receiving device 130 duplicates transmitted data txb0-txb4 in the transmitting device, receiver 130 must include a selectable permutation device 132 to permute the received signal order back to its intended order, prior to analog detection and processing 135.

Such known solutions for bus reversal generally rely on physical reordering of the received bus signals using analog multiplexers or other steering logic at the input of the receiving chip, at the cost of significant receiver complexity. At very high signaling rates, these additional circuit elements introduce impedance anomalies leading to signal degradation. Moreover, it may be impractical to route the necessary signals from one end of the bus across the receiver chip to multiplexers at the other end of the bus to perform such physical bus reordering and still meet timing constraints. Similarly, even though the receiver is typically aware of a reversed bus, it may not be practical to include both a receiver for when the bus wires are reversed, and one for the case of normal operation, as this will lead to area and power penalties.

One familiar with the art may observe that some known art receive solutions, such as use of single-ended line receivers to detect incoming signals, might permit the selectable permutation device 132 to operate in the digital domain, after the line receivers. However, such solutions will not in general be available if differential receivers are used, as will often be the case for high speed, high performance interconnections.

Furthermore, if an ODVS code is used, ignoring bus reversal may have a disastrous effect on differentially detected received signals. For example, consider an ODVS code generated by the s-orthogonal matrix M given below:

$$M = \begin{pmatrix} 1 & 1 & 1 \\ 1 & -1 & 0 \\ 1 & 1 & -2 \end{pmatrix}.$$ [Eqn. 3]

Consider the encoding of the vector (0, 1, −1) as the codeword (0, 1, −1) (after normalization by division by 2, i.e., with a=2 in Eqn. 1). A bus-reversed communications channel would transform this vector into (−1, 1, 0), which is not even a valid codeword. Trying to detect this codeword with the comparators (1,−1,0) and (1/2, 1/2, −1) would lead to the vector (0, −2, 0) which is not the same as the original encoded vector (and cannot even be detected reliably because the last "0" in the vector introduces an ambiguous comparator state.)

However, ODVS code embodiments also exist where bus reversal does not have a disastrous effect and for which compensation can be very efficiently applied using simple digital logic. In one such embodiment, the ODVS code is generated by the Hadamard matrix $$H = \begin{pmatrix} 1 & 1 & 1 & 1 \\ 1 & -1 & 1 & -1 \\ 1 & 1 & -1 & -1 \\ 1 & -1 & -1 & 1 \end{pmatrix}.$$ [Eqn. 4]

A vector (0,x, y, z) is encoded with this matrix to $$((x+y+z)/a,(y-x-z)/a,(x-y-z)/3,(z-x-y)/a)$$ [Eqn. 5]

wherein a is chosen to normalize the resulting values to the range −1 to +1. Bus reversal transforms these values into a set of permuted symbols corresponding to $$((z-x-y)/a,(x-y-z)/a,(y-x-z)/a,(x+y+z)/a)$$ [Eqn. 5]

and final detection of this vector by the comparators (1, −1, 1, −1)/2, (1,1,−1,−1)/2, and (1,−1,−1,1)/2 yields the vector $$2(-x,-y,z)/a.$$ [Eqn. 6]

This is, up to a sign change on the first two entries and scaling, equal to the original bits (x, y, z). This sign change can be easily implemented in digital logic after detection of the signals by the analog receiver. A sign change may correspond to a binary inversion, a signal negation, or any other relevant sign changes known to one of skill in the art.

We call an ODVS code "reversal-amenable" if bus reversal has a similar effect on the signals as for the matrix H. This means that a wire permutation (including but not limited to a full bus reversal) of a codeword, followed by the comparators given by the matrix produces a possibly permuted vector of input bits in which some of the entries may have a reversed sign. An orthogonal generating matrix that generates such an ODVS code is called "reversal-amenable." In applications, a reversal-amenable ODVS code may be preferable to one that is not reversal-amenable. Even if some permutation of the resulting received bits is required to return to non-bus-reversed order, the amount of permutation required will be less than the full bus reversal required by prior art solutions, such permutation may be performed by post-detection digital logic (versus by analog circuitry at the chip input) and, for embodiments using multiple phases of receive signal processing, the required permutations and sign reversals can be done at lower speed within each of the multiple processing phases. Embodiments requiring an explicit decoding operation to recover received data from the detected signals may also advantageously incorporate the required permutation and negation operations for compensation for bus reversal into the decoder logic.

Figure 2:
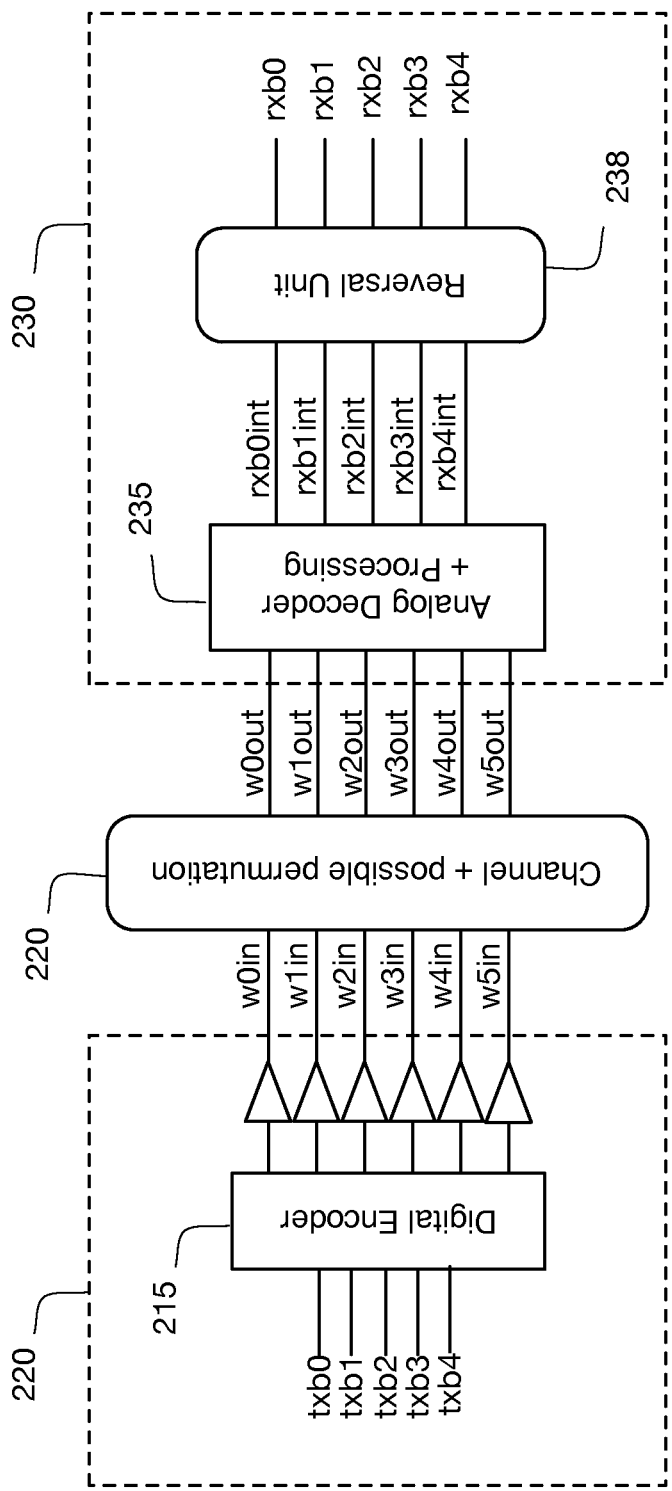
FIG. 2 shows a system in accordance with at least one embodiment, capable of communicating information from a transmitting device to a receiving device over a communications channel which may be bus-reversed.

A system incorporating such a reversal-amenable ODVS code in accordance with at least one embodiment is illustrated in FIG. 2. Transmitting device 220 encodes transmit data txb0, . . . , txb4 to produce an ODVS code, which is emitted as signals w0in, . . . , w5in to communications channel 220. Communications channel 220 may or may not reverse the consecutive ordering of signals w0in, . . . , w5in during transmission to w0out, . . . , w5out, where they are received by receiving device 230. Without explicit permutation or other controllable redirection being performed on the received signals, analog decoder and processing devices shown as 235, which may include without limitation differential line receivers, comparators, multi-input comparators and other analog processing elements detects received signals rxb0int, . . . , rxb4int, which are subsequently processed by digital reversing unit 238 to obtain the received signals rxb0, . . . , rxb4.

Construction of Reversal-Amenable ODVS Codes

In some cases, a reversal-amenable ODVS code may be obtained from a general ODVS code by judiciously permuting the columns of the generating matrix Min Eqn. 1. For example, by permuting columns 2 and 3 of the matrix M in Eqn. 3, we obtain a reversal-amenable ODVS code: A vector (0,x, y) is encoded with the new matrix to a set of original symbols (x+y, −2y, y−x)/a, wherein a is chosen to make sure that the entries of this vector are between −1 and +1. Application of bus reversal leads to the vector of permuted symbols (y−x, −2y, x+y)/a, and final detection via the comparators (1,0,−1), (1/2,−1, 1/2) leads to the vector of output bits (−2x, 3y)/a which is (up to scaling and sign) equal to the original bits.

The following description is of a method to detect whether an orthogonal generating matrix generating an ODVS code can be made reversal-amenable by a permutation of the columns, and for finding a right permutation of the columns that allows this. To this end, the descriptive terminology of matrices and permutations is used herein, as described in standard textbooks on linear algebra and group theory.

A quadratic matrix is called "monomial" if it has exactly one nonzero entry in every row and every column. It is called a "permutation matrix" if it is monomial and the nonzero entry in every row and column is 1. If A is any matrix with n columns and P is a permutation matrix with n rows, then A·P is obtained by permuting the columns of A according to P. Similarly, if A has n rows, then P·A is obtained from A by permuting the rows of A according to P.

The "reversal" matrix R with n rows and columns is the matrix $$R = \begin{pmatrix} 0 & 0 & \ldots & 0 & 1 \\ 0 & 0 & \ldots & 1 & 0 \\ \vdots & \vdots & \ddots & \vdots & \vdots \\ 0 & 1 & \ldots & 0 & 0 \\ 1 & 0 & \ldots & 0 & 0 \end{pmatrix}$$ [Eqn. 7]

i.e., the matrix has only 1's on its main anti-diagonal and is zero elsewhere.

An ODVS generating matrix A is called "P-amenable" if A·P·$A^T$ is a monomial matrix, wherein $A^T$ is the transpose of A and P is a permutation matrix. If A is P-amenable, then a wire permutation corresponding to a permutation of the communication wires according to the matrix P can be easily adjusted at the receiver: the codewords of the ODVS code generated by A are the vectors (0|x)·A/a, wherein x is a vector of length n−1 (if A has size n) and a is a normalization constant. Permutation of the wires corresponds to multiplication of this result by P, and detection of the results corresponds to the multiplication of the new result by $A^T$·D, where D is the diagonal matrix that has as its k-th diagonal entry the sum of the positive entries of the k-th row of A. In total, therefore, the coding and detection of the signals in the presence of a permutation of the wires according to P corresponds to the multiplication (0|x)·A·P·$A^T$·D/a. [Eqn. 8]

The input vector x can now be re-assembled if A·P·$A^T$ is a monomial matrix.

As can be seen by anyone of moderate skill in the art, a reversal-amenable ODVS code is one that is generated by an R-amenable matrix A.

A procedure is now described to compute a permutation matrix U (if it exists) such that A·U is R-amenable. Constructing the ODVS code using A·U would then lead to a reversal-amenable ODVS code. To this end, we call a permutation matrix P with n rows a "matching" if $P^2$ is the identity matrix and either there is no j such that P[j,j]=1 (in case n is even) or there is exactly one j such that P[j,j]=1 (in case n is odd). Here and in the following A[i,j] denotes the (i,j)-entry of matrix A. As is known to those who are somewhat versed in the theory of finite groups, or even only the theory of permutation groups, a matrix P is a matching if and only if there is a permutation matrix U such that U·P·$U^T$=R.

Step 1: Determine whether there is a matching P such that A is P-amenable (for example by calculating A·P·$A^T$ for all matchings P via the procedure below and checking whether the result is monomial).

Step 2: If there is no such matching P, return NO.

Step 3: If there is such a matching P, then proceed as follows:

Step 3.1: Initialize set T as {1, 2, . . . , n} and s=1.

Step 3.2: Pick an element i from T and determine j such that P[i,j]=1.

Step 3.2.1: if j=i, then (necessarily n is odd) set U[j,(n+1)/2]=1.

Step 3.2.2: if j≠i, then set U[i,s]=1, U[j,n−s+1]=1, remove i,j from T, and increase s by 1.

Step 3.2.3: If T is empty, stop, else go to Step 3.2.

Figure 4:
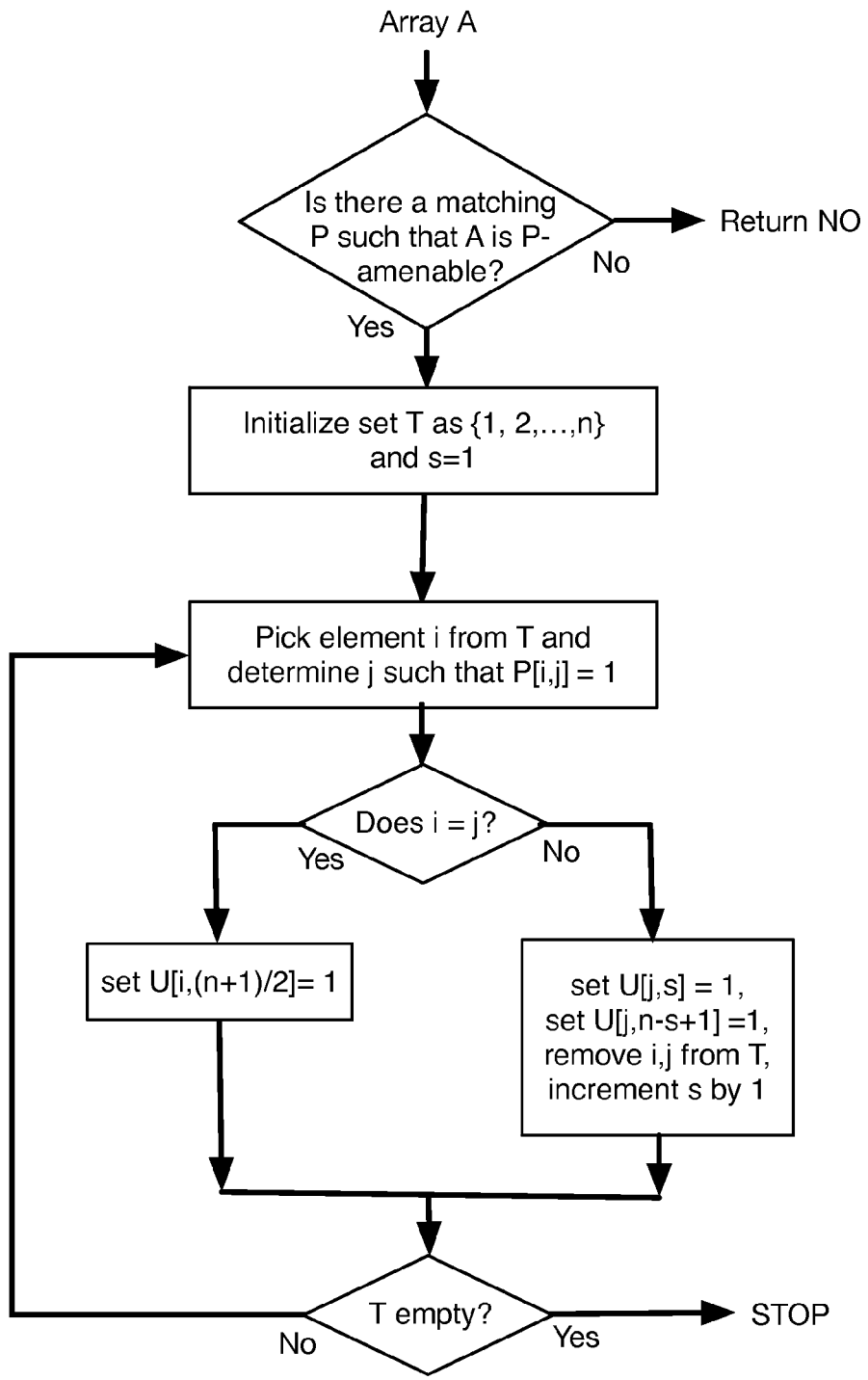
FIG. 4 is a block diagram of a procedure to find reversal-amenable permutations of a matrix.

This procedure is illustrated as the block diagram of FIG. 4.

Amenability to Arbitrary Permutations

In the discussions above we concentrated mostly on reversal-amenable ODVS codes. However, the techniques described can be used to check whether there is a permutation of the columns of an ODVS generating matrix to make it amenable to a given wire permutation, and if so, to calculate one such permutation.

As is known to those of moderate skill in the art, any permutation matrix can be written as a product of disjoint "cycles" wherein a cycle is a permutation matrix cyclically permuting the elements of a subset of {1, . . . , n} (called "permuted subset") and leaving all other elements of this set invariant. The size of the permuted subset is called the "length" of the cycles. Such cycles are called disjoint if the permuted subsets of the cycles are all disjoint. The "cycle structure" of a permutation matrix is the vector obtained from the lengths of the disjoint cycles the product of which is the given permutation matrix.

As is taught by the theory of finite permutation groups, for two permutation matrices P and P' there is a permutation matrix U such that P'=U·P·$U^T$ if and only if P and P' have the same cycle structure.

The procedure above to check whether an ODVS matrix is reversal-amenable can therefore be modified by those of skill in the art to check whether there is a permutation of the columns that makes an ODVS matrix amenable to any permutation matrix P, and to compute the permutation. One example of such an additional procedure is:

Step 1: Determine whether there is a matching Q with the same cycle structure as P such that A is Q-amenable (for example by calculating A·Q·$A^T$ for all permutations Q that have the same cycle structure as P and checking whether the result is monomial).

Step 2: If there is no such matching Q, return NO.

Step 3: If there is such a matching Q, then proceed as follows:

Step 3.1: For all permuted subsets {$k_1$, . . . , $k_r$} of P such that P[$k_1$,$k_2$]=P[$k_2$,$k_3$]= . . . =P[$k_r$,$k_1$]=1, Step 3.1.1: determine a permuted subset {$j_1$, . . . $j_r$} of Q such that Q[$j_1$,$j_2$]=Q[$j_2$,$j_3$]= . . . =Q[$j_r$,$j_1$]=1, Step 3.1.2: set U[$k_1$,$j_1$]=U[$k_2$,$j_2$]= . . . . =U[$k_r$,$j_r$]=1.

next subset.

Figure 5:
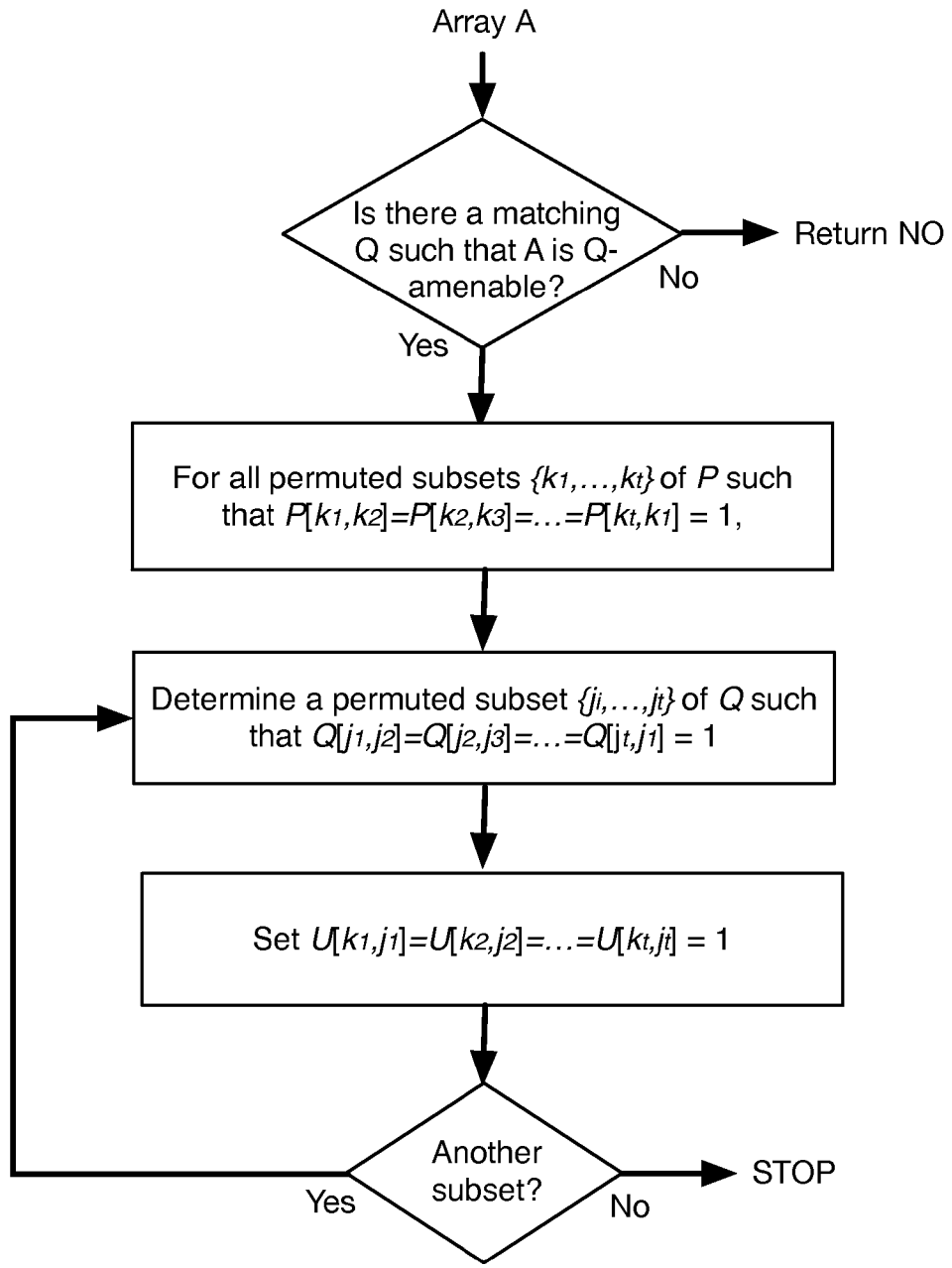
FIG. 5 is a block diagram of an additional procedure to find reversal-amenable permutations of a matrix if matrix columns are permuted.

This additional procedure is illustrated as the block diagram of FIG. 5.

Examples for Reversal-amenability

For the following examples we will use the following economical representation of permutation matrices via vectors. Specifically, a vector $[a_1, a_2, \ldots, a_n]$ with $a_1, a_2, \ldots, a_n$ in $\{1, 2, \ldots, n\}$ corresponds to the matrix having ones in positions $(1, a_1), (2, a_2), \ldots, (n, a_n)$. So, for example, the vector $[2,3,1]$ would correspond to the permutation matrix $$\begin{pmatrix} 0 & 1 & 0 \\ 0 & 0 & 1 \\ 1 & 0 & 0 \end{pmatrix}.$$  [Eqn. 9]

A first example embodiment is an ODVS code generated by the matrix previously described in [Shokrollahi II]:

$$M = \begin{pmatrix} 1 & 1 & 1 & 1 & 1 & 1 \\ 1 & -1 & 0 & 0 & 0 & 0 \\ 1 & 1 & -2 & 0 & 0 & 0 \\ 0 & 0 & 0 & 1 & -1 & 0 \\ 0 & 0 & 0 & 1 & 1 & -2 \\ 1 & 1 & 1 & 1 & -1 & -1 \end{pmatrix}.$$ [Eqn. 10]

In this case there is no matching P such that $M \cdot P \cdot M^T$ is diagonal but there are exactly two matching P for which this matrix is monomial. Of these two, one, namely $P=[4,5,6,1,2,3]$ has the property that $M \cdot P \cdot M^T$ has only one negative entry (corresponding to negating a bit in case of a bus reversal):

$$M \cdot P \cdot M^T = \begin{pmatrix} 6 & 0 & 0 & 0 & 0 & 0 \\ 0 & 0 & 0 & 2 & 0 & 0 \\ 0 & 0 & 0 & 0 & 6 & 0 \\ 0 & 2 & 0 & 0 & 0 & 0 \\ 0 & 0 & 6 & 0 & 0 & 0 \\ 0 & 0 & 0 & 0 & 0 & -6 \end{pmatrix}.$$ [Eqn. 11]

Applying the procedure above leads to a matrix U and new ODVS code generating matrix M·U which is the result of permuting columns 4 and 6 of the matrix M:

$$M \cdot U = \begin{pmatrix} 1 & 1 & 1 & 1 & 1 & 1 \\ 1 & -1 & 0 & 0 & 0 & 0 \\ 1 & 1 & -2 & 0 & 0 & 0 \\ 0 & 0 & 0 & 0 & -1 & 1 \\ 0 & 0 & 0 & -2 & 1 & 1 \\ 1 & 1 & 1 & -1 & -1 & 1 \end{pmatrix}.$$ [Eqn. 12]

Figure 3:
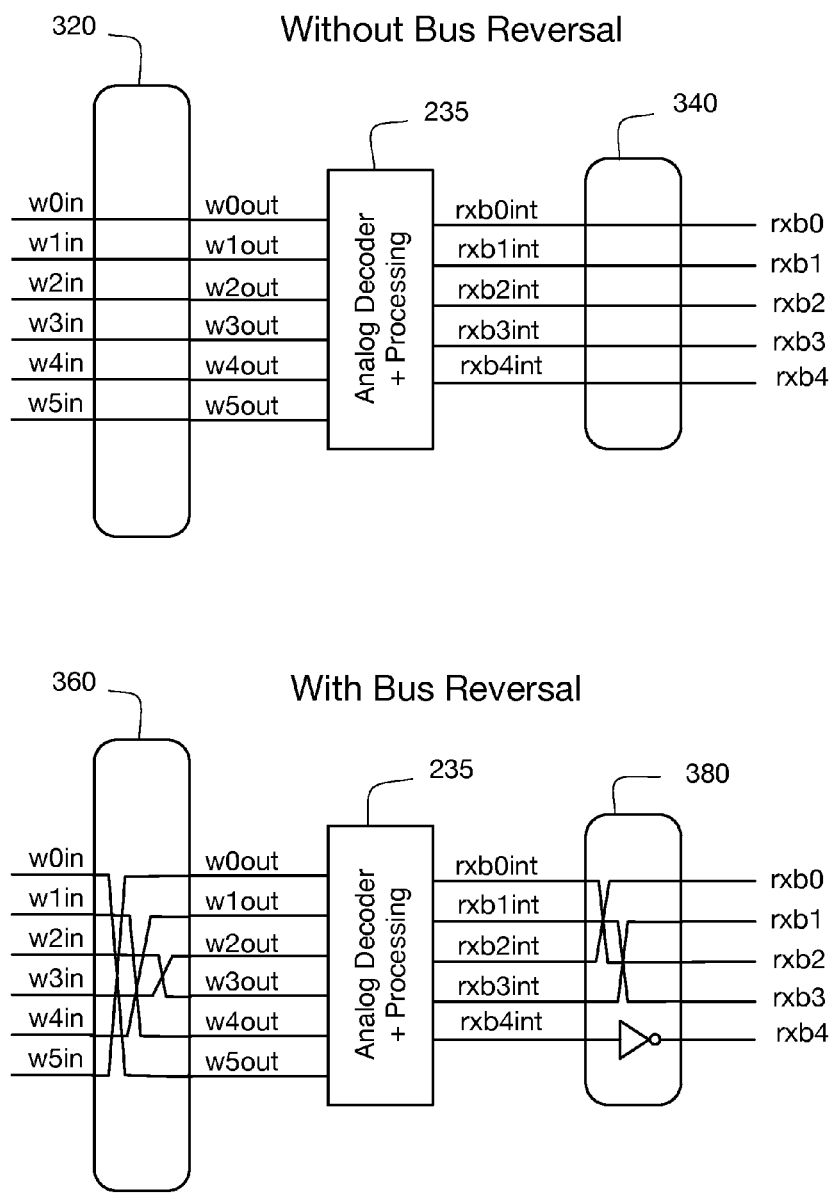
FIG. 3 shows one embodiment of a receiver producing received data from non-bus-reversed received signals, and producing the same received data if the received signals are bus-reversed.

As illustrated in FIG. 3, the ODVS code generated by M·U, allows a receiving device (such as previously shown as 230 in the system diagram of FIG. 2) to tolerate bus reversal. Without bus reversal, communications channel 320 delivers transmitted signals w0in, . . . , w5in directly and without permutation to w0out, . . . , w5out, allowing the analog decoder and processing of 235 to detect received signals rxb0*int*, . . . , rxb4*int*, which are passed directly through reversal unit 340 to received data rxb0, . . . , rxb5. When bus reversal occurs, communications channel 360 reverses the ordering of transmitted signals w0in, . . . , w5in to w0out, . . . , w5out. However, the structure of the reversal-tolerant ODVS code permits analog decoder and processing 235 to detect valid information despite the bus reversed received data. In this example, the proper received data rxb0, . . . , rxb4 is obtained if reversal unit 380 exchanges bits 1 and 3, exchanges bits 2 and 4, and negates bit 5. In at least one embodiment, negating comprises binary inversion, i.e. flipping a '0' to a '1', or a '1' to a '0'. In another embodiment, negating comprises flipping the sign of a value, i.e. a '+1' to a '−1', or a '−1' to a '+1'. However, embodiments should not be so limited.

In other words, if the input bits are $(x_1, \ldots, x_5)$, then the output of the receiver is $(x_3, x_4, x_1, x_2, -x_5)$. The codewords of this code (herein subsequently called the "Glasswing code") are given in Table 1.

TABLE 1

| | |
|---|---|
| ±[1, 1/3, −1/3, −1, −1/3, 1/3] | ±[1, 1/3, −1/3, 1/3, −1, −1/3] |
| ±[1/3, 1, −1/3, −1, −1/3, 1/3] | ±[1/3, 1, −1/3, 1/3, −1, −1/3] |
| ±[1/3, −1/3, 1, −1, −1/3, 1/3] | ±[1/3, −1/3, 1, 1/3, −1, −1/3] |
| ±[−1/3, 1/3, 1, −1, −1/3, 1/3] | ±[−1/3, 1/3, 1, 1/3, −1, −1/3] |
| ±[1, 1/3, −1/3, −1, 1/3, −1/3] | ±[1, 1/3, −1/3, 1/3, −1/3, −1] |
| ±[1/3, 1, −1/3, −1, 1/3, −1/3] | ±[1/3, 1, −1/3, 1/3, −1/3, −1] |
| ±[1/3, −1/3, 1, −1, 1/3, −1/3] | ±[1/3, −1/3, 1, 1/3, −1/3, −1] |
| ±[−1/3, 1/3, 1, −1, 1/3, −1/3] | ±[−1/3, 1/3, 1, 1/3, −1/3, −1] |

One embodiment of an encoder for this code accepts 5 input bits a, b, c, d, e and produces 6 pairs of bits $[x_1, y_1], \ldots, [x_6, y_6]$. The operational meaning of these bit pairs is that a pair [x,y] corresponds to the value $-(2 \cdot (-1)^x + (-1)^y)/3$ on the corresponding wire. The encoding is then given as follows:

$[x_1,y_1]=[mux(NOR(a,b),NAND(a,b),e),a \oplus b \oplus \neg e]$ [Eqn. 13]

$[x_2,y_2]=[mux(NOR(\neg a,b),NAND(\neg a,b),e),a \oplus b \oplus e]$ [Eqn. 14]

$[x_3,y_3]=[b, \neg e]$ [Eqn. 15]

$[x_4,y_4]=[d,e]$ [Eqn. 16]

$[x_5,y_5]=[mux(NOR(\neg c,d),NAND(\neg c,d),e),c \oplus d \oplus \neg e]$ [Eqn. 17]

$[x_6,y_6]=[mux(NOR(c,d),NAND(c,d), \neg e),c \oplus d \oplus e]$ [Eqn. 18]

Here, mux(x,y,e) is x if e=1 and it is y if e=0. Moreover, $\neg a$ is the inverse of a and $\neg$ is the XOR operation.

A second embodiment is a code for 3 wires, derived from the matrix $M_1$ from Eqn. 3. Applying the procedure above, the matrix $$M' = \begin{pmatrix} 1 & 1 & 1 \\ 1 & 0 & -1 \\ 1 & -2 & 1 \end{pmatrix}$$ [Eqn. 19]

is produced, which may be seen to be reversal-amenable. If $x_1, x_2$ denote the input bits, then the output of the receiver in the presence of a bus reversal is $-x_1, x_2$.

One example of a non reversal-amenable code for 4 wires may be seen by considering the generating matrix M of Eqn. 20

$$M = \begin{pmatrix} 1 & 1 & 1 & 1 \\ 1 & -1 & 0 & 0 \\ 1 & 1 & -2 & 0 \\ 1 & 1 & 1 & -3 \end{pmatrix}.$$ [Eqn. 20]

In this case, there is no matching P for which $M \cdot P \cdot M^T$ is monomial. This matrix and the corresponding OPDVS code is therefore not reversal-amenable.

A third example embodiment is an ODVS code for five wires generated by the matrix $$M = \begin{pmatrix} 1 & 1 & 1 & 1 & 1 \\ 1 & -1 & 0 & 0 & 0 \\ 0 & 0 & 1 & -1 & 0 \\ 1 & 1 & -1 & -1 & 0 \\ 1 & 1 & 1 & 1 & -4 \end{pmatrix} \quad \text{[Eqn. 21]}$$

as previously described in [Shokrollahi II]. Applying the procedure above, the matrix M' given as $$M' = \begin{pmatrix} 1 & 1 & 1 & 1 & 1 \\ 1 & 0 & 0 & 0 & -1 \\ 0 & 1 & 0 & -1 & 0 \\ 1 & -1 & 0 & -1 & 1 \\ 1 & 1 & -4 & 1 & 1 \end{pmatrix} \quad \text{[Eqn. 22]}$$

has the property that the associated ODVS code is reversal-amenable. if $x_1, \ldots, x_4$ denote the input bits, then the output bits of the receiver in the presence of a wire permutation corresponding to a bus reversal is $-x_1, -x_2, x_3, x_4$ thus requiring only two signal negations (as one example, using two XOR gates to perform the necessary negations,) to recover the original data during bus-reversed operation.

A fourth example embodiment is of an ODVS code for 6 wires generated by the matrix previously described in [Shokrollahi II]

$$M = \begin{pmatrix} 1 & 1 & 1 & 1 & 1 & 1 \\ 1 & -1 & 0 & 0 & 0 & 0 \\ 0 & 0 & 1 & -1 & 0 & 0 \\ 0 & 0 & 0 & 0 & 1 & -1 \\ 1 & 1 & -1 & -1 & 0 & 0 \\ 1 & 1 & 1 & 1 & -2 & -2 \end{pmatrix}. \quad \text{[Eqn. 23]}$$

Applying the procedure above, the matrix M' given as $$M' = \begin{pmatrix} 1 & 1 & 1 & 1 & 1 & 1 \\ 1 & 0 & 0 & 0 & 0 & -1 \\ 0 & 1 & 0 & 0 & -1 & 0 \\ 0 & 0 & 1 & -1 & 0 & 0 \\ 1 & -1 & 0 & 0 & -1 & 1 \\ 1 & 1 & -2 & -2 & 1 & 1 \end{pmatrix} \quad \text{[Eqn. 24]}$$

has the property that the associated ODVS code is reversal-amenable. In case of a wire permutation corresponding to a bus reversal, the first three bits need to be inverted. In other words, if $x_1, \ldots, x_5$ denote the input bits, then the output of the receiver in the presence of a bus reversal is $-x_1, -x_2, -x_3, x_4, x_5$.

A fifth example embodiment is of an ODVS code for 9 wires generated by the matrix previously described in [Shokrollahi II]:

$$M = \begin{pmatrix} 1 & 1 & 1 & 1 & 1 & 1 & 1 & 1 & 1 \\ 1 & -1 & 0 & 0 & 0 & 0 & 0 & 0 & 0 \\ 0 & 0 & 1 & -1 & 0 & 0 & 0 & 0 & 0 \\ 0 & 0 & 0 & 0 & 1 & -1 & 0 & 0 & 0 \\ 0 & 0 & 0 & 0 & 0 & 0 & 1 & -1 & 0 \\ 1 & 1 & -1 & -1 & 0 & 0 & 0 & 0 & 0 \\ 0 & 0 & 0 & 0 & 1 & 1 & -1 & -1 & 0 \\ 1 & 1 & 1 & 1 & -1 & -1 & -1 & -1 & 0 \\ 1 & 1 & 1 & 1 & 1 & 1 & 1 & 1 & -8 \end{pmatrix}. \quad \text{[Eqn. 25]}$$

Applying the procedure above, the matrix M' given as $$M' = \begin{pmatrix} 1 & 1 & 1 & 1 & 1 & 1 & 1 & 1 & 1 \\ 1 & 0 & 0 & 0 & 0 & 0 & 0 & 0 & -1 \\ 0 & 1 & 0 & 0 & 0 & 0 & 0 & -1 & 0 \\ 0 & 0 & 1 & 0 & 0 & 0 & -1 & 0 & 0 \\ 0 & 0 & 0 & 1 & 0 & -1 & 0 & 0 & 0 \\ 1 & -1 & 0 & 0 & 0 & 0 & 0 & -1 & 1 \\ 0 & 0 & 1 & -1 & 0 & -1 & 1 & 0 & 0 \\ 1 & 1 & -1 & -1 & 0 & -1 & -1 & 1 & 1 \\ 1 & 1 & 1 & 1 & -8 & 1 & 1 & 1 & 1 \end{pmatrix} \quad \text{[Eqn. 26]}$$

is reversal-amenable. If $x_1, \ldots, x_8$ denote the input bits, then the output of the receiver in the presence of a bus reversal is $-x_1, -x_2, -x_3, -x_4, x_5, x_6, x_7, x_8$.

There are several interesting matching P such that $M \cdot P \cdot M^T$ is monomial. For example, using P=[5, 6, 7, 8, 1, 2, 3, 4, 9] yields a new matrix M'

$$M' = \begin{pmatrix} 1 & 1 & 1 & 1 & 1 & 1 & 1 & 1 & 1 \\ 1 & -1 & 0 & 0 & 0 & 0 & 0 & 0 & 0 \\ 0 & 0 & 1 & -1 & 0 & 0 & 0 & 0 & 0 \\ 0 & 0 & 0 & 0 & 0 & 0 & 0 & -1 & 1 \\ 0 & 0 & 0 & 0 & 0 & -1 & 1 & 0 & 0 \\ 1 & 1 & -1 & -1 & 0 & 0 & 0 & 0 & 0 \\ 0 & 0 & 0 & 0 & 0 & -1 & -1 & 1 & 1 \\ 1 & 1 & 1 & 1 & 0 & -1 & -1 & -1 & -1 \\ 1 & 1 & 1 & 1 & -8 & 1 & 1 & 1 & 1 \end{pmatrix} \quad \text{[Eqn. 27]}$$

which is also reversal-amenable. In this case, the output of the receiver in the presence of a bus reversal is $x_3, x_4, x_1, x_2, x_6, x_5, -x_7, x_8$ so only one negation is necessary to obtain the original bits, at the cost of some additional data reordering.

The examples presented herein illustrate the use of orthogonal differential vector signaling codes for point-to-point interconnection of a transmitting device and a receiving device for descriptive simplicity. However, this should not been seen in any way as limiting the scope of any described embodiments. The methods disclosed in this application are equally applicable to other interconnection topologies, including multi-drop and star-wired interconnection of more than two devices, and other communications protocols including full-duplex as well as half-duplex and simplex communications. Similarly, wired communications are used as illustrative examples, with other embodiments also being applicable to other communication media including optical, capacitive, inductive, and wireless communications. Thus, descriptive terms such as "voltage" or "signal level" should be considered to include equivalents in other measurement systems, such as "optical intensity", "RF modulation", etc. As used herein, the term "physical signal" includes any suitable behavior and/or attribute of a physical phenomenon capable of conveying information. Physical signals may be tangible and non-transitory.

Embodiments

Figure 6:
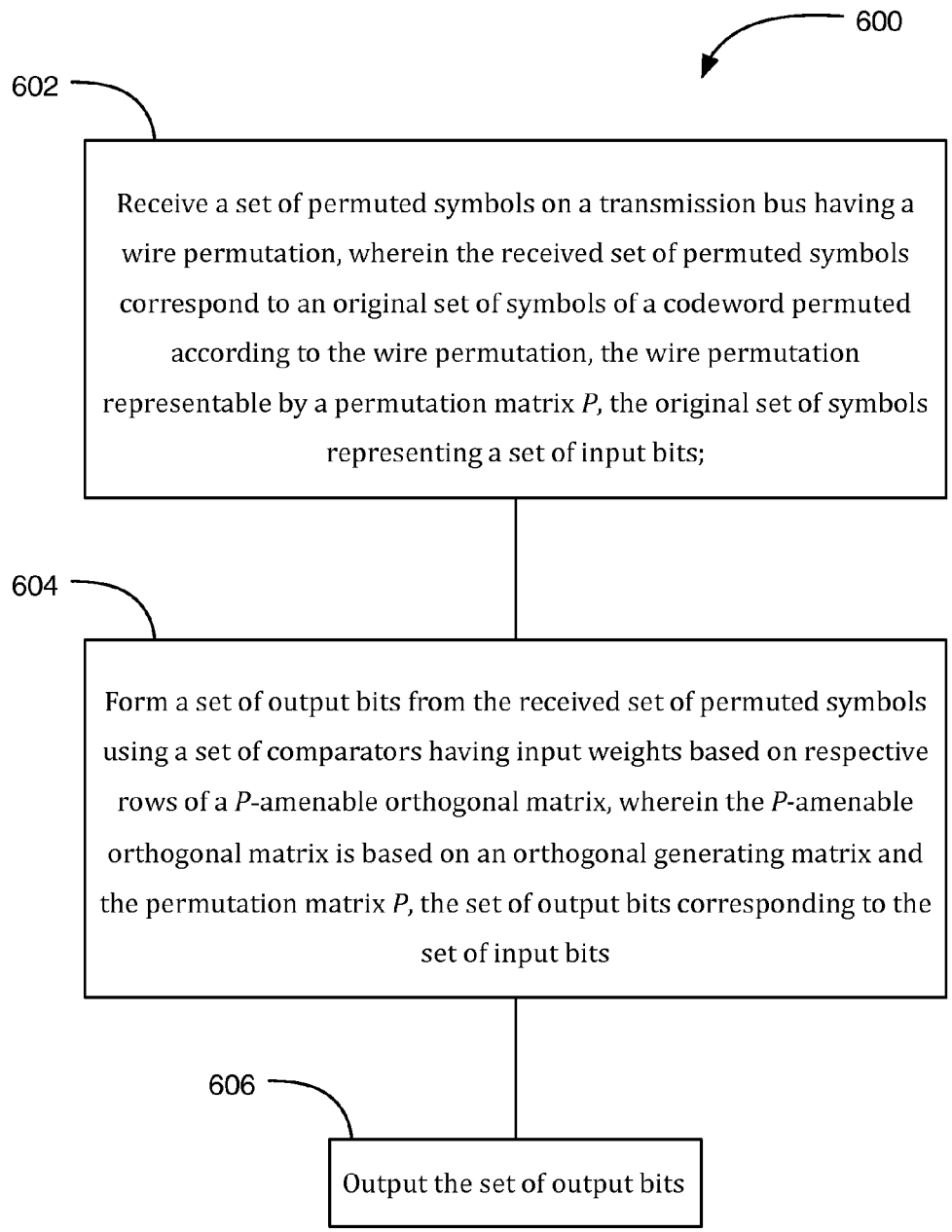
FIG. 6 shows a method in accordance with at least one embodiment.

As shown in FIG. 6, a method 600 in accordance with at least one embodiment, comprises receiving, in step 602, a set of permuted symbols on a transmission bus having a wire permutation, wherein the received set of permuted symbols correspond to an original set of symbols of a codeword permuted according to the wire permutation, the wire permutation representable by a permutation matrix P, the original set of symbols representing a set of input bits, forming, in step 604, a set of output bits from the received set of permuted symbols using a set of comparators having input weights based on respective rows of a P-amenable orthogonal matrix, wherein the P-amenable orthogonal matrix is based on an orthogonal generating matrix and the permutation matrix P, the set of output bits corresponding to the set of input bits, and outputting, in step 606, the set of output bits.

In at least one embodiment forming the set of output bits further comprises generating a set of comparator outputs, wherein the comparator outputs correspond to the output bits.

In at least one embodiment, forming the set of output bits further comprises generating a set of comparator outputs, and performing a logical reordering of the set of comparator outputs.

In at least one embodiment, forming the set of output bits further comprises generating a set of comparator outputs, and performing a binary inversion of at least one of the comparator outputs.

In at least one embodiment, the codeword is part of an Orthogonal Differential Vector Signaling (ODVS) code.

In at least one embodiment, the P-amenable orthogonal matrix is representable as:

$$M' = \begin{pmatrix} 1 & 1 & 1 \\ 1 & 0 & -1 \\ 1 & -2 & 1 \end{pmatrix},$$

and for a set of input bits represented as $[x_1\ x_2]$, a set of comparator outputs represented as $[-x_1\ x_2]$, forming the set of output bits comprises a binary inversion of comparator output $-x_1$.

In another embodiment, the P-amenable orthogonal matrix is representable as:

$$M' = \begin{pmatrix} 1 & 1 & 1 & 1 & 1 \\ 1 & 0 & 0 & 0 & -1 \\ 0 & 1 & 0 & -1 & 0 \\ 1 & -1 & 0 & -1 & 1 \\ 1 & 1 & -4 & 1 & 1 \end{pmatrix},$$

and for a set of input bits represented as $[x_1\ x_2\ x_3\ x_4]$ a set of comparator outputs represented as $[-x_1\ -x_2\ x_3\ x_4]$, forming the set of output bits comprises a binary inversion of comparator outputs $-x_1$ and $-x_2$.

In another embodiment, the P-amenable orthogonal matrix is representable as:

$$M' = \begin{pmatrix} 1 & 1 & 1 & 1 & 1 & 1 \\ 1 & 0 & 0 & 0 & 0 & -1 \\ 0 & 1 & 0 & 0 & -1 & 0 \\ 0 & 0 & 1 & -1 & 0 & 0 \\ 1 & -1 & 0 & 0 & -1 & 1 \\ 1 & 1 & -2 & -2 & 1 & 1 \end{pmatrix},$$

and for a set of input bits represented as $[x_1\ x_2\ x_3\ x_4\ x_5]$, a set of comparator outputs represented as $[-x_1\ -x_2\ -x_3\ x_4\ x_5]$, forming the set of output bits comprises a binary inversion of comparator outputs $-x_1$, $-x_2$, and $-x_3$.

In at least one embodiment, the permutation matrix P is represented as:

$$P = \begin{pmatrix} 0 & 0 & \ldots & 0 & 1 \\ 0 & 0 & \ldots & 1 & 0 \\ \vdots & \vdots & \ddots & \vdots & \vdots \\ 0 & 1 & \ldots & 0 & 0 \\ 1 & 0 & \ldots & 0 & 0 \end{pmatrix},$$

corresponding to a full transmission bus reversal.

In at least one embodiment, the permutation matrix P is represented as:

$$P = \begin{pmatrix} 1 & 0 & \ldots & 0 & 0 \\ 0 & 1 & \ldots & 0 & 0 \\ \vdots & \vdots & \ddots & \vdots & \vdots \\ 0 & 0 & \ldots & 1 & 0 \\ 0 & 0 & \ldots & 0 & 1 \end{pmatrix},$$

corresponding to no transmission bus permutation.

In accordance with at least one embodiment, an apparatus comprises a transmission bus configured to receive a set of permuted symbols, wherein the permuted symbols represent a wire permutation of a set of original symbols based on a permutation matrix P, the wire permutation matrix P associated with the transmission bus, and wherein the set of original symbols represents a set of input bits, and a decoder configured to generate a set of output bits based on the set of permuted symbols using a set of comparators having input weights based on a P-amenable orthogonal matrix, the P-amenable orthogonal matrix based on a an orthogonal generating matrix and the permutation matrix P, wherein the set of output bits corresponds to the set of input bits.

In accordance with that least one embodiment, the plurality of comparators are configured to generate a set of comparator outputs, and wherein the set of output bits corresponds to the set of comparator outputs.

In accordance with that least one embodiment, the plurality of comparators are configured to generate a set of comparator outputs, and generating the set of output bits comprises a logical reordering of the comparator outputs.

In accordance with that least one embodiment, the plurality of comparators are configured to generate a set of comparator outputs, and generating the set of output bits comprises a binary inversion of at least one of the comparator outputs.

In accordance with that least one embodiment, the permutation matrix P is represented as:

$$P = \begin{pmatrix} 1 & 0 & \ldots & 0 & 0 \\ 0 & 1 & \ldots & 0 & 0 \\ \vdots & \vdots & \ddots & \vdots & \vdots \\ 0 & 0 & \ldots & 1 & 0 \\ 0 & 0 & \ldots & 0 & 1 \end{pmatrix}.$$

In accordance with that least one embodiment, the permutation matrix P corresponds to a full reversal matrix R, the full reversal matrix R represented as:

$$R = \begin{pmatrix} 0 & 0 & \ldots & 0 & 1 \\ 0 & 0 & \ldots & 1 & 0 \\ \vdots & \vdots & \ddots & \vdots & \vdots \\ 0 & 1 & \ldots & 0 & 0 \\ 1 & 0 & \ldots & 0 & 0 \end{pmatrix}.$$

In accordance with that least one embodiment, the orthogonal generating matrix is represented by M:

$$M = \begin{pmatrix} 1 & 1 & 1 & 1 & 1 \\ 1 & -1 & 0 & 0 & 0 \\ 0 & 0 & 1 & -1 & 0 \\ 1 & 1 & -1 & -1 & 0 \\ 1 & 1 & 1 & 1 & -4 \end{pmatrix},$$

the P-amenable orthogonal matrix is represented by M':

$$M' = \begin{pmatrix} 1 & 1 & 1 & 1 & 1 \\ 1 & 0 & 0 & 0 & -1 \\ 0 & 1 & 0 & -1 & 0 \\ 1 & -1 & 0 & -1 & 1 \\ 1 & 1 & -4 & 1 & 1 \end{pmatrix},$$

and for a set of input bits represented as $[x_1\ x_2\ x_3\ x_4]$ and a set of comparator outputs represented as $[-x_1\ -x_2\ x_3\ x_4]$, forming the set of output bits comprises inverting comparator outputs $-x_1$ and $-x_2$.

In accordance with that least one embodiment, the orthogonal generating matrix is represented by M:

$$M = \begin{pmatrix} 1 & 1 & 1 & 1 & 1 & 1 \\ 1 & -1 & 0 & 0 & 0 & 0 \\ 0 & 0 & 1 & -1 & 0 & 0 \\ 0 & 0 & 0 & 0 & 1 & -1 \\ 1 & 1 & -1 & -1 & 0 & 0 \\ 1 & 1 & 1 & 1 & -2 & -2 \end{pmatrix},$$

the P-amenable orthogonal matrix is represented by M':

$$M' = \begin{pmatrix} 1 & 1 & 1 & 1 & 1 & 1 \\ 1 & 0 & 0 & 0 & 0 & -1 \\ 0 & 1 & 0 & 0 & -1 & 0 \\ 0 & 0 & 1 & -1 & 0 & 0 \\ 1 & -1 & 0 & 0 & -1 & 1 \\ 1 & 1 & -2 & -2 & 1 & 1 \end{pmatrix},$$

and for a set of input bits represented as $[x_1\ x_2\ x_3\ x_4\ x_5]$ and a set of comparator outputs represented as $[-x_1\ -x_2\ -x_3\ x_4\ x_5]$, forming the set of output bits comprises inverting comparator outputs $-x_1$, $-x_2$, and $-x_3$.

In accordance with that least one embodiment, an apparatus comprises an encoder configured to receive a set of input bits and responsively generate a set of symbols of a codeword based on the set of input bits and a P-amenable orthogonal matrix, the P-amenable orthogonal matrix based on orthogonal generating matrix and a permutation matrix P, and a transmission bus configured to form a set of permuted symbols, wherein the permuted symbols represent a wire permutation of the set of symbols of the codeword, the wire permutation based on the permutation matrix P, the permutation matrix P associated with the transmission bus, and to transmit the set of permuted symbols.

In accordance with at least one embodiment, the P-amenable orthogonal matrix represents a permutation of columns of the orthogonal generating matrix.

We claim:

1. A method comprising:
   receiving a set of permuted symbols on a transmission bus having a wire permutation, wherein the received set of permuted symbols correspond to an original set of symbols of a codeword permuted according to the wire permutation, the wire permutation representable by a permutation matrix P, the original set of symbols representing a set of input bits;
   forming a set of output bits from the received set of permuted symbols using a set of comparators having input weights based on respective rows of a P-amenable orthogonal matrix, wherein the P-amenable orthogonal matrix is based on an orthogonal generating matrix and the permutation matrix P, the set of output bits corresponding to the set of input bits; and,
   outputting the set of output bits.

2. The method of claim 1, wherein forming the set of output bits further comprises generating a set of comparator outputs, wherein the comparator outputs correspond to the output bits.

3. The method of claim 1, wherein forming the set of output bits further comprises generating a set of comparator outputs, and performing a logical reordering of the set of comparator outputs.

4. The method of claim 1, wherein forming the set of output bits further comprises generating a set of comparator outputs, and performing a binary inversion of at least one of the comparator outputs.

5. The method of claim 1, wherein the P-amenable orthogonal matrix is representable as:

$$M' = \begin{pmatrix} 1 & 1 & 1 \\ 1 & 0 & -1 \\ 1 & -2 & 1 \end{pmatrix},$$

and for a set of input bits represented as $[x_1\ x_2]$, a set of comparator outputs represented as $[-x_1\ x_2]$, forming the set of output bits comprises a binary inversion of comparator output $-x_1$.

6. The method of claim 1, wherein the P-amenable orthogonal matrix is representable as:

$$M' = \begin{pmatrix} 1 & 1 & 1 & 1 & 1 \\ 1 & 0 & 0 & 0 & -1 \\ 0 & 1 & 0 & -1 & 0 \\ 1 & -1 & 0 & -1 & 1 \\ 1 & 1 & -4 & 1 & 1 \end{pmatrix},$$

and for a set of input bits represented as [$x_1$ $x_2$ $x_3$ $x_4$] a set of comparator outputs represented as [$-x_1$ $-x_2$ $x_3$ $x_4$], forming the set of output bits comprises a binary inversion of comparator outputs $-x_1$ and $-x_2$.

7. The method of claim 1, wherein the P-amenable orthogonal matrix is representable as:

$$M' = \begin{pmatrix} 1 & 1 & 1 & 1 & 1 & 1 \\ 1 & 0 & 0 & 0 & 0 & -1 \\ 0 & 1 & 0 & 0 & -1 & 0 \\ 0 & 0 & 1 & -1 & 0 & 0 \\ 1 & -1 & 0 & 0 & -1 & 1 \\ 1 & 1 & -2 & -2 & 1 & 1 \end{pmatrix},$$

and for a set of input bits represented as [$x_1$ $x_2$ $x_3$ $x_4$ $x_5$], a set of comparator outputs represented as [$-x_1$ $-x_2$ $-x_3$ $x_4$ $x_5$], forming the set of output bits comprises a binary inversion of comparator outputs $-x_1$, $-x_2$, and $-x_3$.

8. The method of claim 1, wherein the codeword is part of an Orthogonal Differential Vector Signaling (ODVS) code.

9. The method of claim 1, wherein the permutation matrix P is a monomial matrix having a single '1' value in each column and in each row and '0' values elsewhere, each respective column associated with a respective symbol of the permuted set of symbols, wherein each respective column selects a respective symbol of the original set of symbols as the respective symbol of the permuted set of symbols, the selection based on a location of the '1' value in the respective column.

10. The method of claim 9, wherein the permutation matrix P is represented as:

$$P = \begin{pmatrix} 0 & 0 & \ldots & 0 & 1 \\ 0 & 0 & \ldots & 1 & 0 \\ \vdots & \vdots & \ddots & \vdots & \vdots \\ 0 & 1 & \ldots & 0 & 0 \\ 1 & 0 & \ldots & 0 & 0 \end{pmatrix},$$

corresponding to a full transmission bus reversal.

11. An apparatus comprising:
a transmission bus configured to receive a set of permuted symbols, wherein the set of permuted symbols represents a wire permutation of a set of original symbols based on a permutation matrix P, the permutation matrix P associated with the transmission bus, and wherein the set of original symbols represents a set of input bits; and,
a decoder configured to generate a set of output bits based on the set of permuted symbols using a set of comparators having input weights based on a P-amenable orthogonal matrix, the P-amenable orthogonal matrix based on an orthogonal generating matrix and the permutation matrix P, wherein the set of output bits corresponds to the set of input bits.

12. The apparatus of claim 11, wherein the set of comparators are configured to generate a set of comparator outputs, and wherein the set of output bits corresponds to the set of comparator outputs.

13. The apparatus of claim 11, wherein the set of comparators are configured to generate a set of comparator outputs, and generating the set of output bits comprises a logical reordering of the comparator outputs.

14. The apparatus of claim 11, wherein the set of comparators are configured to generate a set of comparator outputs, and generating the set of output bits comprises a binary inversion of at least one of the comparator outputs.

15. The apparatus of claim 11, wherein the orthogonal generating matrix is represented by M:

$$M = \begin{pmatrix} 1 & 1 & 1 & 1 & 1 \\ 1 & -1 & 0 & 0 & 0 \\ 0 & 0 & 1 & -1 & 0 \\ 1 & 1 & -1 & -1 & 0 \\ 1 & 1 & 1 & 1 & -4 \end{pmatrix},$$

the P-amenable orthogonal matrix is represented by M':

$$M' = \begin{pmatrix} 1 & 1 & 1 & 1 & 1 \\ 1 & 0 & 0 & 0 & -1 \\ 0 & 1 & 0 & -1 & 0 \\ 1 & -1 & 0 & -1 & 1 \\ 1 & 1 & -4 & 1 & 1 \end{pmatrix},$$

and for a set of input bits represented as [$x_1$ $x_2$ $x_3$ $x_4$] and a set of comparator outputs represented as [$-x_1$ $-x_2$ $x_3$ $x_4$], forming the set of output bits comprises inverting comparator outputs $-x_1$ and $-x_2$.

16. The apparatus of claim 11, wherein the orthogonal generating matrix is represented by M:

$$M = \begin{pmatrix} 1 & 1 & 1 & 1 & 1 & 1 \\ 1 & -1 & 0 & 0 & 0 & 0 \\ 0 & 0 & 1 & -1 & 0 & 0 \\ 0 & 0 & 0 & 0 & 1 & -1 \\ 1 & 1 & -1 & -1 & 0 & 0 \\ 1 & 1 & 1 & 1 & -2 & -2 \end{pmatrix},$$

the P-amenable orthogonal matrix is represented by M':

$$M' = \begin{pmatrix} 1 & 1 & 1 & 1 & 1 & 1 \\ 1 & 0 & 0 & 0 & 0 & -1 \\ 0 & 1 & 0 & 0 & -1 & 0 \\ 0 & 0 & 1 & -1 & 0 & 0 \\ 1 & -1 & 0 & 0 & -1 & 1 \\ 1 & 1 & -2 & -2 & 1 & 1 \end{pmatrix},$$

and for a set of input bits represented as [$x_1$ $x_2$ $x_3$ $x_4$ $x_5$] and a set of comparator outputs represented as [$-x_1$ $-x_2$ $-x_3$ $x_4$ $x_5$], forming the set of output bits comprises inverting comparator outputs $-x_1$, $-x_2$, and $-x_3$.

17. The apparatus of claim 11, wherein the permutation matrix P is a monomial matrix having a single '1' value in each column and in each row and '0' values elsewhere, each respective column associated with a respective symbol of the permuted set of symbols, wherein each respective column selects a respective symbol of the original set of symbols as the respective symbol of the permuted set of symbols, the selection based on a location of the '1' value in the respective column.

18. The apparatus of claim 17, wherein the permutation matrix P is represented as:

$$P = \begin{pmatrix} 0 & 0 & \cdots & 0 & 1 \\ 0 & 0 & \cdots & 1 & 0 \\ \vdots & \vdots & \ddots & \vdots & \vdots \\ 0 & 1 & \cdots & 0 & 0 \\ 1 & 0 & \cdots & 0 & 0 \end{pmatrix},$$

corresponding to a full transmission bus reversal.

19. An apparatus comprising:
an encoder configured to receive a set of input bits and responsively generate a set of symbols of a codeword based on the set of input bits and a P-amenable orthogonal matrix, the P-amenable orthogonal matrix based on orthogonal generating matrix and a permutation matrix P; and,
a transmission bus configured to form a set of permuted symbols, wherein the set of permuted symbols represents a wire permutation of the set of symbols of the codeword, the wire permutation based on the permutation matrix P, the permutation matrix P associated with the transmission bus, and to transmit the set of permuted symbols.

20. The apparatus of claim 19, wherein the P-amenable orthogonal matrix represents a permutation of columns of the orthogonal generating matrix.

* * * * *